(12) United States Patent
Samson

(10) Patent No.: US 6,820,800 B2
(45) Date of Patent: Nov. 23, 2004

(54) ELECTRONIC CALCULATOR

(76) Inventor: Ilan Zadik Samson, 8a Chesterford Gardens, London NW3 7DE (GB)

( * ) Notice: Subject to any disclaimer, the term of this patent is extended or adjusted under 35 U.S.C. 154(b) by 98 days.

(21) Appl. No.: 10/343,621
(22) PCT Filed: Aug. 1, 2001
(86) PCT No.: PCT/GB01/03414
  § 371 (c)(1),
  (2), (4) Date: Feb. 3, 2003
(87) PCT Pub. No.: WO02/11104
  PCT Pub. Date: Feb. 7, 2002

(65) Prior Publication Data
  US 2003/0154222 A1 Aug. 14, 2003

(30) Foreign Application Priority Data
  Aug. 2, 2000 (GB) .............................. 0018850

(51) Int. Cl.⁷ .............................. B06C 23/00
(52) U.S. Cl. ................................. 235/61 R; 708/131
(58) Field of Search .................... 235/61 R; 708/1, 708/100, 130, 131, 290, 800

(56) References Cited

U.S. PATENT DOCUMENTS

| | | | | |
|---|---|---|---|---|
| 4,051,605 A | * | 10/1977 | Toal et al. | 434/201 |
| 4,954,977 A | * | 9/1990 | Colombat | 708/162 |
| 5,139,423 A | * | 8/1992 | McCormack et al. | 434/201 |

* cited by examiner

Primary Examiner—Karl D. Frech
(74) Attorney, Agent, or Firm—Jon A. Gibbons; Fleit, Kain, Gibbons, Gutman, Bongini & Blanco, P.L.; Alec Messulam

(57) ABSTRACT

An electronic calculator having means for enabling a user to input a calculation, characterized in that the calculator has a mode of operation in which the user is required to input additionally at least one estimate of the result of the calculation before the correct result of the calculation is displayed.

18 Claims, 3 Drawing Sheets

ELECTRONIC CALCULATOR

CROSS REFERENCE TO RELATED APPLICATIONS

This application is based upon and claims priority from prior PCT Application No. PCT/GB01/03414, filed Aug. 1, 2001, the disclosure of which is hereby incorporated by reference in its entirety.

The present invention relates to electronic calculators and in particular to calculators of the kind commonly used at present by most people and especially by schoolchildren and students, The widespread use of calculators by schoolchildren and students has over the years tended to engender complete reliance on them at the expense of the student's losing quantitative conception, feel for numbers and the ability to carry out calculations by mental arithmetic, even approximately.

One attempted solution to this problem has been simply to attempt to ban the use of calculators in certain situations. This too is wrong. Once people having mastered manual arithmetic for them to continue to do so manually only is a waste of time. The use of calculators is there to avoid this waste of time. Also, manual calculations, such as long multiplication and long division, often do not throw much light on the expected values and are prone to undetected gross mistakes.

The present invention is concerned with providing a calculator which addresses these problems and provides a solution which reconciles the currently contradictory demands and views associated with this problem. The present invention is concerned with getting schoolchildren and students who use calculators to actually do some thinking as they do so.

According to the present invention, there is provided an electronic calculator having means for enabling a user to input a calculation, characterised in that the calculator has a mode of operation in which, after entering a calculation to be performed by the calculator, the user is required to input additionally an estimate of the result of the calculation and, for at least a predetermined number of attempts, the result of the calculation is displayed by the calculator only if the estimate lies within a predetermined tolerance range of the correct result.

In the preferred embodiment of the invention, the tolerance range is determined by the calculator in dependence upon the nature of the operators, the numerical value of the operands in the calculation and any tolerance range of the operands.

There now follows an explanation of the intended meaning of a number of terms which are used in this patent specification:

Predetermined Tolerance

This term could refer to a fixed tolerance expressed either as an absolute value (for example ±10) or as a percentage of the result (for example ±10%). In the preferred embodiments described below, however, this term is used to refer to a case-specific actual tolerance which is worked out by the calculator using predetermined rules or algorithms, that is, rules that are built into the calculator for establishing the actual tolerance for each particular case of operation type and operands value and their previously established tolerances, if any.

Operations String

The term refers to an arithmetic calculation which comprises at least two distinct stages or arithmetic operations. For example the sum A+B comprises a single stage and single operator '+' whereas the sum (A+B)·C comprises two stages and two operators, namely addition operator '+' and multiplication operator '·'. Thus an operations string includes at least two operators and/or functions e.g. sin (A+B), the operators being 'sin' and '+'.

Type of Calculator

The present invention is applicable to the range from so-called four function calculators to typical so-called scientific calculators (i.e. containing some or all of trigonometric, exponential, logarithmic, roots, reciprocal, factorial function keys) which employ numbered memories, multi-level brackets, M+ and M− keys and correct operations order hierarchy, i.e.: function, '·', '÷', '+' and '−', e.g. if the keyed in order is A+B·C cosine, cosine C is evaluated out first, then this result is multiplied by B and to this result A is added.

Operations Strings and Tolerances

Unless stated otherwise the display displays only keyed in numbers and no intermediate result. There are two approaches to calculating the tolerances which apply to an operations string i.e. to calculations which have at least two stages or operators.

Approach I is to have the tolerances of the operations built up successively as the calculation progresses through the string of stages from beginning to end, i.e. the total end tolerance is some form of accumulation of the individual tolerances of the successive stages. Only upon '=' has the user to key in the estimate which is then checked by the calculator, and if it is found to be within the total end tolerance the correct result is displayed. Thereafter, if the user wishes, he can continue with further stages, using the result of the previous '=' as the next operand.

Approach II would be to halt the calculation after every stage, test the user's estimate against the correct answer up to that point and if within the acceptable tolerance then display the correct result of the sub-calculation and then continue with the next stage using the correct intermediate figure as its starting point.

Tolerances

Each stage in a string (or where there is only a single stage) consists of operand 1, operator, operand 2, or example

4·5, or operand, function, operand 2 if required by function, for example 31 sine (or sin(31)–in EOS), or 3 $x^y$ 6.2 (these are the keys that have to be operated.)

The operands are either keyed in numbers, or memory recall numbers or, in cases of strings, results from previous stages. The operation of each stage of the calculation receives a '±' tolerance which is the acceptable range for the mental estimate of this operation.

In the simplest case, that of a single stage (or always in Approach II) e.g. A+B or A·B (A and B being keyed in numbers), the tolerance is calculated according to the rules relating to the respective operation, hereafter referred to 'tol(op)'. The rules are detailed later.

In Approach I, in the case of a stage in the string where both operands are results of previous stages, e.g.: the adding stage in A·B+C/D, it is necessary to represent the fact that the added quantities already have a tolerance which resulted from the earlier stage in which they were calculated, namely, the tolerances resulting from the multiplication A×B and division C/D. Therefore the total tolerance after the addition stage in A·B+C/D is the combination of tol(A·B), tol(C/D) and the tolerance of the addition. Using E for the result of A·B and F for the result C/D the tolerance following the addition can be written as tol(E) "+" tol(F) "+" tol(op); tol(op) in this case is tol(+).

The addition operator is placed in inverted commas to express the fact that tolerances are not necessarily added up arithmetically but could be cumulatively combined in other ways e.g. RSS (Root Sum(of) Squares) specifically for +, − operations the combined absolute tolerances would be the RSS of the absolute values of the tolerances of the operands and the tolerance of the operation (see example [E.4] below), while for ·, ÷ operations the combined relative tolerance would be the RSS of the relative value of the tolerances of the operands and the operation.

Considering the tolerance of the adding stage of A·B+C where the A·B has already been carried out and C is keyed in the complete tolerance is built up from the tolerances resulting from the A·B stage and from tol(+). (C has no tolerance because it has been keyed in).

Thus, in Approach I in a lengthy string e.g. A+B·C−D/E+F·G·H=the tolerance would build up until the '=' is keyed in.

However there are certain cases where the user will preferably have to be asked to make intermediate estimates. This is associated with the prevention of means of extracting the correct result from the calculator without doing any mental arithmetic. The following are circumstances in which such intermediate estimates will be preferably required:

i) When the user closes a bracket. For example in the sum

4·[6+(5+4·3)+122]

the user will be asked [e.g. by flashing ( )] to make an intermediate estimate of that part of the sum which is contained within the curved brackets and then to make an estimate of the part of the sum contained in the square brackets. If the estimate is acceptable, the correct value of the contents of the respective brackets is displayed, and this quantity then loses its tolerance when used in further stages.

ii) Normally, a number will be put in a store ('STO'), for use later, only it it was just keyed in, or following '=' or function key, in both of which cases an estimate for it would already have been requested and accepted and then replaced by its correct value, or where this occurs following ')' (redundant or otherwise). In any other case where the user can store a number the user will be required to make an estimate of the number to be stored, and if accepted, its correct value will be stored. Upon 'recall' the correct value is then displayed, and has no tolerance if used in further stages.

iii) Upon inputting a function, such as a trigonometric function or log function etc, the user will also be required (e.g. by flashing the function name) to make an intermediate estimate of its value. Again if it is acceptable, the correct value will be displayed and used without tolerance.

By providing what is otherwise a standard calculator with the above defined capability it is possible for users to obtain the benefit of calculators provided that they are prepared to exercise sufficient of their mental arithmetical capabilities to obtain at least an acceptable approximation to the correct answer. Thus the mental arithmetical capabilities and quantitative conceptions of users of such calculators will progressively be put into practice every time the calculator is used thus improving the user's mental arithmetical capabilities whilst at the same time not denying the user the benefits which a calculator provides in avoiding the need for lengthy detailed exact calculations.

The invention will now be described further, by way of example, with reference to the accompanying drawings, in which.

DETAILED DESCRIPTION OF AN EMBODIMENT

Figure 1:
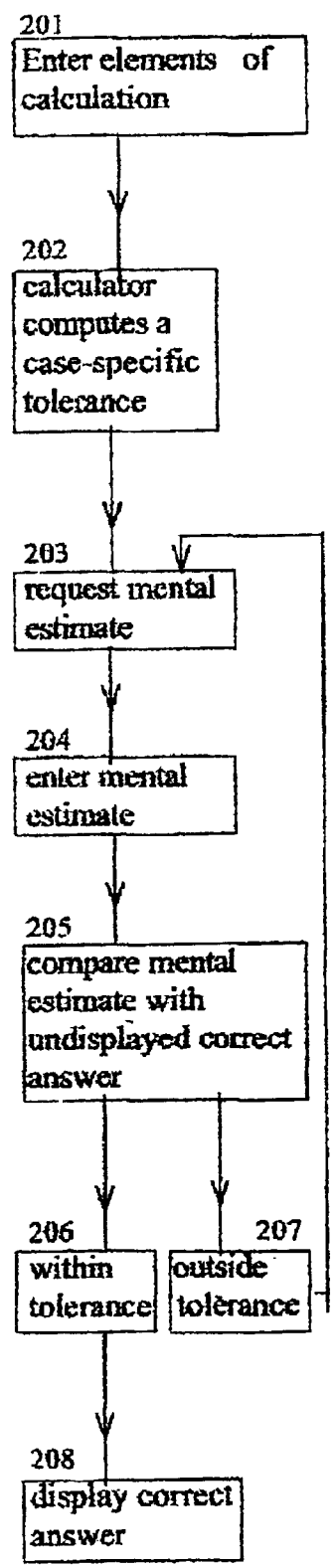
FIG. 1 is a flow chart which illustrates the operational stages involved in using a calculator according to the present invention for single stage/operator calculation.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

FIG. 1 illustrates a single stage calculation having a single operator using the calculator incorporating the present invention. Typically the calculation could be A+B. The user firstly enters the elements of the desired calculation in the normal way, this being shown at stage 201 in FIG. 1.

The calculator then computes a tolerance for the operator '+' from an algorithm built into the calculator. This is shown at 202.

The user is then asked by the calculator to enter a mental arithmetic estimate of the correct answer, this being illustrated at stage 203.

This request could be effected by displaying a flashing equals sign (=).

The user then keys in the mental arithmetic estimate at 204.

The calculator then makes a comparison between the mental arithmetic estimate and the correct answer (that, in a normal calculator, would already have been displayed by the calculator to the user). This comparison is essentially concerned with ascertaining whether the mental arithmetic estimate is within the tolerance computed at stage 202. This comparison stage is shown at 205.

If the mental arithmetic estimate is within the predetermined tolerance(s), as indicated at 206, then the correct answer, i.e. the one that would normally have been already displayed with a normal calculator, is then displayed as indicated at 208.

If, on the other hand, the mental arithmetic estimate is outside the tolerance(s) built into the calculator this fact is indicated by the calculator display such as by the continual flashing of the 'equals' sign at 207. The flashing rate could be arranged to be proportional to the degree of accuracy of the mental arithmetic estimate, i.e. the more accurate it is the higher the flashing rate. The user is then invited to enter a second attempt at a mental estimate i.e. the process goes back to 203.

Figure 2:
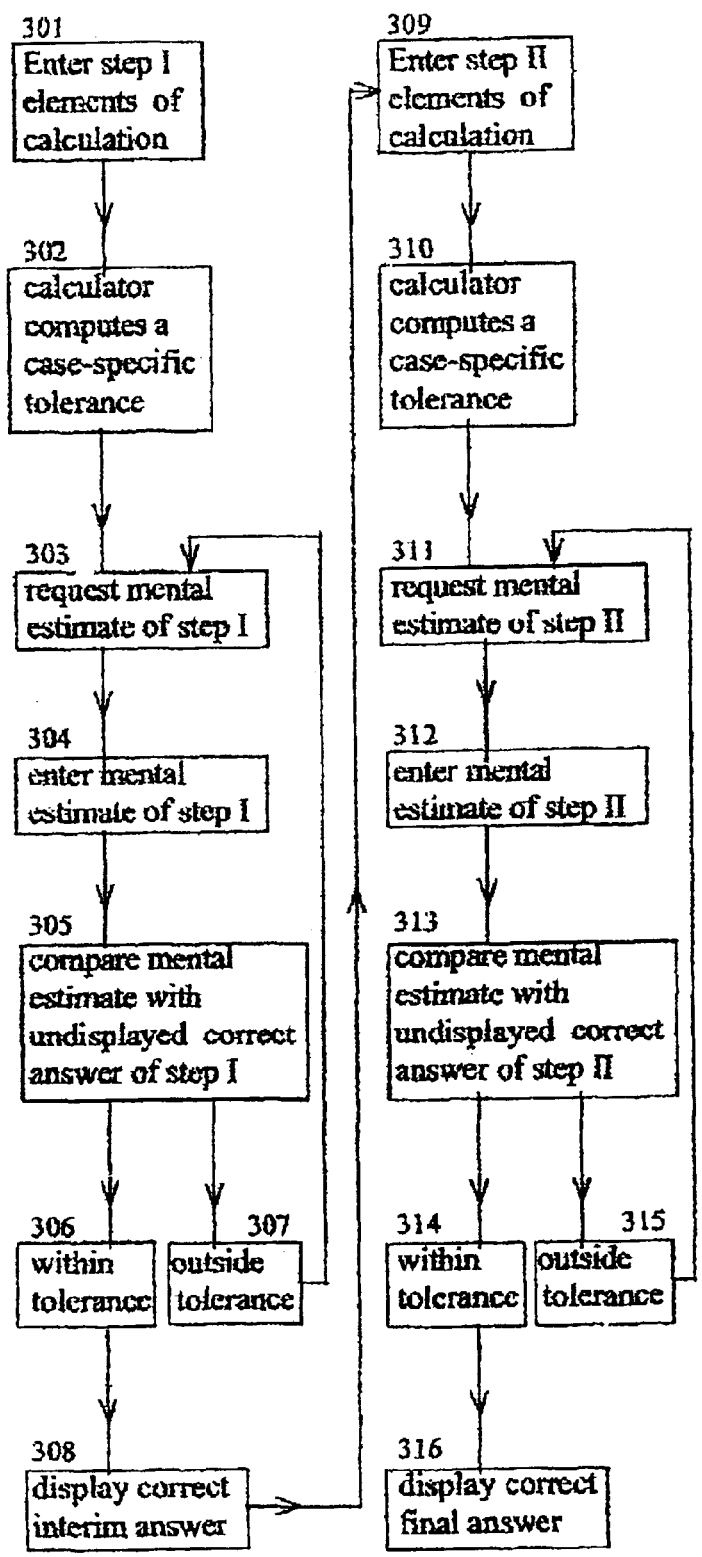
FIG. 2 is similar to FIG. 1 but for a two-stage/two operator calculation according to Approach II.

FIG. 2 is similar to FIG. 1 but illustrates a two-stage calculation where there is an intermediate calculation stage so that in this instance there are in effect two sets of calculation to be made.

The first stage of calculations, producing the intermediate answer, is illustrated in stages 301 to 308.

Once the first stage of the calculation has been completed the end result is the display at 308 of the correct interim answer.

A similar sequence of stages is then executed labelled 309 to 316 in order to produce a second, and in this case, the final stage in the calculation.

The point to be noted about this (Approach II) multiple stage calculation is that after the completion of each stage (which includes checking its estimate) the correct answer of this stage is displayed and used as a basis for carrying out the next stage rather than accumulating the tolerances which would have applied to the mental estimate associated with the each stage.

Figure 3:
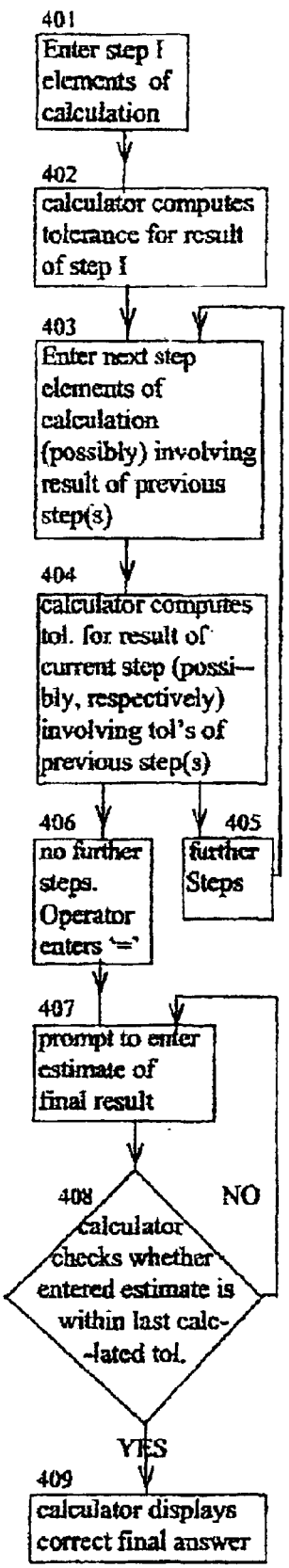
FIG. 3 is illustrates a multi-stage calculation according to Approach I.

As an alternative to the approach illustrated in FIG. 2 the whole calculation could proceed uninterrupted from beginning to end with only one (final) mental estimate being entered by the user (Approach I). This is illustrated in FIG. 3.

The user enters the elements of the first stage of the calculation (401). The calculator then computes a tolerance for the result of this stage from the algorithm built into the calculator This is shown at 402.

The user now enters the elements of the next stage which, possibly, involves the result of the previous stage(s). This is shown at 403. The calculator then computes a tolerance for the result of this stage, and if the current stage involved result(s) from previous stage(s) then their tolerance(s) would contribute to the tolerance of the current stage. This is shown at 404.

If the user wishes to key in a further operation (405) the procedure returns to stage 403. If there are no further stages in the calculation the user signifies this by entering '=' (406), and the a prompt (e.g. a flashing '=') is displayed for the user to enter an estimate for the result of the entire calculation. This is shown in 407.

The calculator now checks whether the entered estimate for the complete calculation lies within the tolerance for the result of the complete calculation (as was computed during the last passage through stage 404). This is shown at 408.

If this estimate is not accepted the prompt is displayed again (407). If the estimate is accepted the actually correct result of the calculation is displayed (409).

It needs to be pointed out that, for ease of understanding, the above illustrates the procedure in a schematic way only. In actual fact the way calculators usually work requires a somewhat different sequence. For example: if there was a three-stage calculation A·B+C·D, the user keys '+' as the second stage but the above shown stages for the second stage are not yet carried out because the third stage C·D is handled first; only upon keying in another '+' or '−' operator, or a '=', are the stages relating to the second stage ('+') handled. For ease of understanding FIG. 3 does not refer to the special situations where even in 'Approach I' intermediate estimates are required.

The algorithm for the tolerances referred to are contained in a chip incorporated into the calculator. Alternately, the said calculator can be simulated on a computer, using corresponding software.

Clearly within the broad concept of providing tolerances for the various elements comprising a particular arithmetic calculation there is the question of how those tolerances would be arrived at.

The present invention is therefore concerned with providing an approach to the question of determining the tolerance(s) which will a) ensure that the required mental estimate is reasonable for each particular situation, b) ensure that it is not a simple matter to obtain is the correct result from the calculator without carrying out any mental estimate, and c) be defined as a compact set of rules so as not lead to an over complication and cost increase in the additional electronics (in the form of a chip) which would be incorporated in what is otherwise a standard calculator.

Bearing these requirements in mind the tolerances which would be applied to the various arithmetical operations including 'plus', 'minus', 'multiplication' and 'division' and other functions will now be discussed.

Rules for Tolerances i.e. tol(op)

Addition i) A tolerance of, for example, ±1.0 to 1.5 is given for each position (the term position is used to indicate the digit multiplying each integer power of ten in a number, i.e. each decimal place is a position and each of the units, tens, hundreds etc is a position in the number) in the answer, provided that in the corresponding position in the operands both digits are non-zero; The leading one of these could receive a smaller tolerance, e.g. ±0.1 to 0.5.

ii) In case of an overflow or a 'carry' in any position, i.e. a total greater than '9', the position to its left, namely the one overflowed into, receives a small tolerance, e.g. ±0.1 to 0.5, in excess of what it would get otherwise.

The tolerance should be limited to, preferably, the value of half the smaller operand.

[E.1], [E.2]

Subtraction

It is assumed that the user subtracts the smaller number from the larger one and sets the correct sign to the result—no tolerance is allowed for this. The tolerance rules are basically the same as for addition except that the tolerance applies to all non-0 positions in the subtracted operand, 'overflows' above is replaced by 'underflows' (and 'overflows into' by 'underflows from') i.e. where the digit being subtracted is greater than the one from which it is being subtracted.

The tol(op) applicable to subtraction operations should not be greater than a certain fraction of the correct result of the subtraction (its abs. val). For example this could be set a maximum of 0.3.

Multiplication and Division

The tolerance for the operator '·' or '÷' refers to a value which is relative to i.e. fraction of, the result and it is proposed that it should be in the range 0.08 to 0.1 plus another suggest 0.01 for each second and third non-zero digit in the operands [E.3]. There would be little or no tolerance allowed if both operands are either single digit or if any operand in a multiplication or a division operation is $10^n$, or very close to it.

[E.4]

Overriding Tolerance Correction

If it is felt that the algorithms described thus far produce either too onerous or too generous a tolerance range, then the calculator could have the facility (built into the chip) for applying externally, at the end of the overall calculation, a correction which will either increase or decrease the absolute value of the tolerance.

An overall limit could be placed on the total tolerance permitted. It is suggested that this limit could be in the range of −50% to +100%. One reason for this is that the user might attempt to build up a larger total tolerance by so-called 'dummy operations' which do not affect the result e.g. a sequence such as ·3, ÷3, ·3, ÷3—entered solely in order to increase the tolerance.

Anti-Cheat Protection

When considering the result of an addition or subtraction operation if the highest position with a tolerance, as discussed above, is higher up than for example the fourth position counting from the least significant one then the result is rounded so that the significant figures start from three positions behind the said highest position with a tolerance (the number of dropped digits can be shown in brackets. [E.5]

Tolerances for Certain Functions (based on the user understanding the meaning of the functions)

(all '$\alpha$' stand for $\pm 180\ n\pm\alpha$)

$\sin(\alpha)$: for $\alpha=0, 30, 90°$: tol 0
   else, 0–30: tol$\pm 0.05$ truncated at 0, 0.5 (e.g. 0.5 is upper limit for $\alpha<30$ etc.)
   else 30–90: tol$\pm 0.1$ truncated at 0.5, 1. [E.6]

$\cos(\alpha)$: for $\alpha$ 0, 60, 90°: tol 0
   else, 0–60: tol$\pm 0.1$ truncated at 1, 0.5 (e.g. 0.5 is lower limit for $\alpha<60$ etc)
   else 60–90: tol$\pm 0.05$ truncated at 0.5, 0

$\tan(\alpha)$: for $\alpha$ 0, 45°: tol 0
   else: tol$\pm 20\%$ truncated at 0, 1 inv.tan: for 0, 1: tol 0
   else: tol$\pm 20\%$ truncated at 0, 45 inv.sin: for 0, 0.5, 1: tol 0
   else, $\alpha$ 0–0.7: tol$\pm 5$ truncated at 0, 30
   $\alpha$ 0.7–1: tol$\pm 15/-5$ truncated at 90 [E.7]

inv.cos: for 0, 0.5, 1: tol 0
   else, $\alpha$ 0–0.7: tol$\pm 5$ truncated at 90, 60
   $\alpha$ 0.7–1: tol$\pm 15/-5$ truncated at 0.

for trig fn of rad & grad: tol as above+8% (i.e. the '·' tol, for the conversion to deg.)

$x^2$: same as for multiplication $\sqrt{x}$: double multiplication tolerance $x^y$: (no tol if y=0,1) if y integer: as with sequence of y multiplications (i.e. $\sqrt{[y \cdot (tol\ of\ mult)^2]}$) [E.8]
   if y not int.: ditto+20% to –5%
   if y -ve: ditto with y+1 (because of additional division)

1/x: same as '/'

$\log_{10}$: tol+0.25 to –0.1 truncated at integer boundaries (i.e. no tol on integer part)

ln: ditto$\pm 8\%$ [because of multiplication by 2.3 (ln 10)] [E.9]

$e^x$: as for $x^y$ n!: n 0–6: tol 0; n 7,8: tol$\pm 20\%$; n 9–12: $\pm 1$ ord. of mag. n>12: either $\pm 2$ ord. Of mag [$(0.4\ n)^n$ is within $\pm 1$ ord. of mag. Of n!]

or $\infty$ tol, i.e. display correct value anyway

The above functions-tolerances are based on reasonable expectation of estimation ability. Different expectations could be reflected in variations to the above examples.

The following is a summary of the stages which a user would have to go through in using Approach I of a calculator incorporating the present invention. [E.10]

First, the user would have to write out the complete calculation in the order in which it is going to be keyed or otherwise inputted into the calculator. The user would then key in the elements of the arithmetic calculation in the order in which they have been written. Each time an interim 'ask' appears the user must provide a mental estimate for this stage. If this interim estimate is successful in the sense of being within the specified tolerance then the intermediate stage up to that point will be overwritten with the actual correct answer to the intermediate stage. Having reached the end of the total calculation and keyed in '=', the user must carry out an estimate for the whole calculation using the correct interim result referred to immediately above. This final estimate must then be keyed in. Assuming that it is within the specified tolerances then the correct answer will be displayed by the calculator.

The following features are optional:

a) The calculator would be switchable into a normal mode of operation in which the user is no required to provide an estimate of the answer. In such a case, the switching could produce a signal, such as an electromagnetic signal or preferably a directional sound such as high pitched/white noise, to alert the teacher. Alternatively, the switching could be carried out only by the teacher using a PIN code, an encoded card or by transmitting an RF signal to switch all the calculators in a classroom at the same time.

b) Performance scoring. The calculator could compute score that reflects the quality of the user entered estimates. For each calculation, the score could be one minus the ratio of the deviation of the estimate from the correct answer, divided by the respective tolerance. A running average of the score could then be computed and stored. The running average could be initialised at any time and when the running average is initialised, the previous running average could be kept or a new count could be commenced. The scoring could include all attempts or only the accepted ones. A separate running score could be kept of the proportion of the accepted estimates.

c) The correct result(s) could be shown after one or more inadequate estimates. In such cases a nuisance could be introduced such as a time delay, a requirement to re-enter the operation, etc. (to discourage the user reaching the supplied result by rapid entries of unconsidered estimates).

d) The calculated tolerance could be replaced by a manually-set +/– value or a fraction of the result.

e) Instead of a calculation, an equation could be entered with the variable as '?' or 'x' etc. Preferably the unknown would have to be on the left, and the entry terminated by hitting 'enter'. The user would then have to enter an estimate for the solution of the equation, and if this is within the tolerance, the correct solution will be displayed. Preferably, the tolerance would then be set manually as in (d).

f) Instead of the above-described procedure where the calculator performs the calculation as it is being keyed in, the calculation could be first keyed in and displayed completely; Only after this is terminated by the '=' (or 'enter'), would the calculator proceed with performing the calculation, halting whenever an intermediate estimate is required, highlighting the section for which said interim estimate is required, and upon acceptance of the estimate overwrite the highlighted section with its correct value, then proceed. Upon completion, the '=' could be flashed for the estimate of the final result.

g) When the procedure described in (f) is used, then instead of the above 'Anti-Cheat' Protection [E.5] a pair of preferred alternatives, which do not incur loss of significant figures, can be used whenever an addition/subtraction takes place between two values:

i) If the total tolerance of the stage would exceed the tolerance of any of the two operands by preferably, two or more orders of magnitude an estimate will be required for the said operand, (unless it was keyed-in, or had already been estimated, accepted and replaced by its correct value).

ii) If the tolerance of one of the operands is, preferably, two or more orders of magnitude greater than the other operand an estimate is required for the first operand. Once a required estimate is accepted, it is overwritten with its correct value and it loses its tolerance.

Also an estimate for contents of brackets would then be required only for i) sum/difference of operands of very different order of magnitude e.g. 2+, ii) when the contents of the bracket are raised to a power, and iii) square brackets or redundant brackets (for user-induced requests for intermediate estimates).

h) The calculator could have a test mode of operation in which it generates the calculations to be performed by the user.

i) The correct result could be displayed after a given number of unacceptable estimates. This, however, could be facilitated only by impeding stages, times-wise and/or nuisance-wise.

j) ditto, where tasks are generated randomly and/or according to a pre-determined course adjusted or not by the recorded level of estimation performance k) personal codes could be used, so that separate scores and/or courses can be kept for separate users Exemplary Implementations It is proposed that a calculator incorporating the present invention would have a distinctive external appearance. This could be achieved in a number of ways including by making it with a distinctive overall shape and/or by making it a distinctive color. The reason for doing so is that if calculators of the present invention were adopted as being the only type which would be acceptable in a classroom, then the teacher would need to be able to see instantly whether or not any calculator being used by a student was acceptable.

While the invention has been described by reference to a calculator, it should be clear that it may apply equally to a computer, such as a personal computer, that is programmed to perform the function of a calculator. References to a calculator should therefore be construed to include any medium carrying a program that enables a computer to function as a calculator and to a computer that is programmed to perform in the same manner as a dedicated calculator.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

A computer system may include, inter alia, one or more computers and at least a computer readable medium, allowing a computer system, to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer readable medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer system to read such computer readable information.

It is proposed that a calculator incorporating the present invention would have a distinctive external appearance. This could be achieved in a number of ways including by making it with a distinctive overall shape and/or by making it a distinctive colour. The reason for doing so is that if calculators of the present invention were adopted as being the only type which would be acceptable in a classroom, then the teacher would need to be able to see instantly whether or not any calculator being used by a student was acceptable.

While the invention has been described by reference to a calculator, it should be clear that it may apply equally to a computer, such as a personal computer, that is programmed to perform the function of a calculator. References to a calculator should therefore be construed to include any medium carrying a program that enables a computer to function as a calculator and to a computer that is programmed to perform in the same manner as a dedicated calculator.

Examples of tolerance range calculations

[E.1]:

Tolerance when adding 274084.6 to 3610.98

(using tol of 1.0 per position that is non-0 in both operands, 0.2 for the leading one, and a 0.5 'bonus' for overflowed-into positions)

$$\begin{array}{r} 2\ 7\ 4\ 0\ 8\ 4\ .6\ + \\ 3\ 6\ 1\ 0\ .9\ 8 \\ \hline \text{tol for each posn:} \quad .2\ 0\ 1.5\ 1\ 0 \end{array}$$

so the tolerance of the result 277695.58 is $$0.2 \cdot 1000 + 0 \cdot 100 + 1 \cdot 10 + 0.5 \cdot 1 + 1 \cdot 0.1 = \pm 210.6$$

Thus, an estimate of, say, 277600 is easily accepted.

[E.2]:

$$\begin{array}{r} 2\ 7\ 4\ 5\ 8\ 4\ .6\ + \\ 7\ 6\ 1\ 0\ .2 \\ \hline \text{tol for each posn.:} \quad .5\ 7\ 1\ 1\ 0\ 1 \end{array}$$

so the tolerance over the correct result of 282194.8 is $$0.5 \times 10000 + 0.7 \times 1000 + 1 \times 100 + 1 \times 10 + 1 \times 0.1 = \pm 5810.1$$

This is more than half of the smaller operand, so it is reduced to ±3805; thus an estimate of e.g. 280000 is easily accepted

[E.3]: Multiplication of 762·51 (using 1.0 from the 0.08–1.0 range)

762·51:

the tol fraction of the correct result (38862) is +0.01 for each of the 6,2,1=0.11, so the actual tol is 0.11×38862= 4275; thus an estimate of 40000 is easily accepted

[E.4]:

$$\begin{array}{cc} A & B \\ 34 \cdot 0.57 + 7/0.13: \end{array}$$
correct result: 19.38 + 53.85 ... ( = 73.23 ...)

tol(A): (0.08+0.01×2)×19.38=1.94
tol(B): (0.08+0.01×1)×53.85=4.85
tol(+): 0.2×10+1+0.1+0.01=3.11
Total tol: $\sqrt{(1.94^2+4.85^2+3.11^2)}$=6.07; thus an estimate of 70 (20+50) is easily accepted

[E.5]:

$$\begin{array}{r} 440066 + \\ \underline{25.67} \end{array} \text{ (both numbers keyed in):}$$

the 10's position is the highest with a tolerance, so the correct result i.e. 440091.67 is untempered. However: if the 440066 had resulted from 220033×2 it has a tol of 0.09× 440066=19806 i.e. a tol in the 10000 position. Therefore the result of the addition will be rounded to the 10's position, i.e. to 440090.00, and the 1.67 will be lost.

[E.6]:
The tol range of sin 32 (=0.52) will be from 0.5 to 0.62

[E.7]:
The tol range of $\sin^{-1}$ 0.55 (=33.4) is 30 to 38.4

[E.8]:
The relative tol of $(3.8)^4$ (=208.5) is $\sqrt{(0.09^2 \times 4)}$=0.18, the absolute tol thus 208.5×0.18=37.5,
thus an estimate 200 is easily acceptable in the range of 208.5±37.5

[E.9]
$\log_{10}$ 850 (=2.93) has a tol between 2.68 and 3, thus an expectable estimate 2.8 is easily accepted

[E.10]: (3·46+512.2)·0.12−8.1/sin 10
The user writes this down, then starts to key it in in the order written (not doing any estimations yet); As soon as the ')' is keyed in a flashing '( )' requires an estimate for the value of (3·46+512.2); The user then keys in an estimate e.g. 640; this is accepted because it is well within the correct value (650.2)± its tol of $\sqrt{[(0.09 \times 138)^2 + 31.1^2]}$=33.5, (the 1$^{st}$ term comes from the 3×64, the 2$^{nd}$ from the '+', the 512.2 has no tol because it is keyed in), thus the correct result (650.2) is displayed. The user writes this over the (3·46+ 512.2) (the overwritten quantity now having no tol).

He then proceeds to key in the rest. Having keyed in the 10 the 'sin' flashes; Say the user estimates sin 10 as 0.15 (10×1/60); this is accepted because the tol is 0.05 and the correct result is 0.174; this result is thus displayed and the user write it over the sin 10.

He now has 650.2·0.12−8.1/0.175; Upon keying the '=' it flashes and the user estimates the whole task, say as 80−50= 30. The tol is composed of the tols of
  650.2·0.12, of 8.1/0.175 and the '−':
  $\sqrt{[(0.10 \cdot 650.2 \cdot 0.12)^2 + (0.11 \cdot 8.1/0.175)^2 + 3^2]}$=9.8
so the estimated 30 is well within the correct result of 31.95± the tol, and so the 31.95 is displayed.

Conclusion

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. An electronic calculator having means for enabling a user to input a calculation, characterized in that the calculator has a mode of operation in which, after entering a calculation to be performed by the calculator, the user is required to input additionally an estimate of the result of the calculation and, for at least a predetermined number of attempts, the result of the calculation is displayed by the calculator only if the estimate lies within a predetermined tolerance range of the correct result.

2. A calculator as claimed in claim 1, wherein the tolerance range has any one of fixed absolute value, an absolute value inputted into the calculator, a value equal to a fixed percentage of the correct result and a value equal to a percentage of the correct result inputted into the calculator.

3. An electronic calculator having means for enabling a user to input a calculation, characterized in that the calculator has a mode of operation in which, after entering a calculation to be performed by the calculator, the user is required to input additionally an estimate of the result of the calculation and, for at least a predetermined number of attempts, the result of the calculation is displayed by the calculator only if the estimate lies within a predetermined tolerance range of the correct result, the tolerance range being determined by the calculator in dependence upon the nature of the operators, the numerical value of the operands in the calculation and any tolerance range of the operands.

4. A calculator as claimed in claim 3, wherein the tolerance range determined by the calculator additionally takes into consideration a fixed severity factor entered into the calculator or a variable severity factor that is automatically incremented by the calculator with amount of usage or in dependence upon the performance of the user.

5. A calculator as claimed in claim 3, wherein during the execution of a calculation involving several operators, the user is requested to enter an interim estimate of stages of the calculation in addition to the estimate of the final result.

6. A calculator as claimed in claim 5, wherein an interim estimate is required each time the calculator processes certain predetermined operators.

7. A calculator as claimed in claim 5, in which following correct estimation by the user of a stage of the calculation, the correct value of that interim result is displayed to the user and the tolerance for that interim result is reduced to zero.

8. A calculator as claimed in claim 7, wherein, depending on the nature of the operators involved, a stage estimate is required to be entered in dependence upon of the result of the comparison of:
  the values of operands with one another;
  the values of interim tolerance ranges with one another; and/or
  the values of interim tolerance ranges with values of operands.

9. A calculator as claimed in claim 3, wherein when the calculation involves the sum of or difference between two operands, a separate contribution is made to the range from each of the positions representing powers of ten in the sum, the contribution being dependent upon the digits occupying that position in each of the two operands.

10. A calculator as claimed in claim 9, wherein, when considering the result of an addition or subtraction operation, if the highest position with a tolerance is higher up than the fourth position counting from the least significant one, then the result is rounded so that the significant figures start from three positions behind the said highest position with a tolerance.

11. A calculator as claimed in claim 10, wherein after a predetermined number of estimates have been entered that lie outside the predetermined tolerance range of the correct result, the calculator displays the correct result of the calculation.

12. A calculator as claimed in claim 11, wherein following the entry of each estimate that lies outside the predetermined tolerance range of the correct result, a predetermined time delay or other nuisance to the user is imposed before a further estimate can be entered or before the correct result is displayed.

13. A calculator as claimed in claim 12, wherein a measure of the ability of the user in mental arithmetic is derived from analysis of the estimates provided by the user.

14. A calculator as claimed in claim 13, having a second mode of operation in which the user is not required to enter an estimate of the result in order for the result to be displayed and means are provided for switching between the two operating modes.

15. A calculator as claimed in claim 14, in which the switching into the second mode of operation is accompanied by the emission of an acoustic or electromagnetic signal.

16. A calculator as claimed in claim 15, in which switching into the second mode of operation requires the inputting of a code into the calculator, the transmission of a coded signal to the calculator, or the insertion of an encoded mechanical or electromagnetic key into the calculator.

17. A calculator as claimed in claim 16, wherein the calculator has a further mode of operation for testing the user, in which further mode the calculation operators and operands are set by the calculator.

18. A calculator as claimed in claim 17, wherein the calculation can be inputted into the calculator in the form of an equation having at least one variable and in which the user is required to input additionally at least one estimate of the value of the variable that satisfies the equation before the correct value of the variable is displayed.

* * * * *